(12) United States Patent
Chen et al.

(10) Patent No.: US 10,763,571 B2
(45) Date of Patent: *Sep. 1, 2020

(54) ANTENNA STRUCTURE AND WIRELESS COMMUNICATION DEVICE USING SAME

(71) Applicant: Chiun Mai Communication Systems, Inc., New Taipei (TW)

(72) Inventors: Jin-Bo Chen, New Taipei (TW); Cheng-An Chen, New Taipei (TW); Chih-Wei Liao, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 136 days.

This patent is subject to a terminal disclaimer.

(21) Appl. No.: 16/051,018

(22) Filed: Jul. 31, 2018

(65) Prior Publication Data

US 2019/0097308 A1 Mar. 28, 2019

(30) Foreign Application Priority Data

Sep. 27, 2017 (CN) .......................... 2017 1 0890527

(51) Int. Cl.
*H01Q 1/00* (2006.01)
*H01Q 1/24* (2006.01)
(Continued)

(52) U.S. Cl.
CPC ........... *H01Q 1/243* (2013.01); *G06F 1/1626* (2013.01); *G06F 1/1698* (2013.01);
(Continued)

(58) Field of Classification Search
CPC .... H04B 5/0018; H04B 10/00; H04B 7/1555; H04B 10/2581; H04W 40/06;
(Continued)

(56) References Cited

U.S. PATENT DOCUMENTS 9,905,909 B2 2/2018 Liou et al.
10,547,100 B2 * 1/2020 Lin ....................... H04M 1/026
(Continued)

FOREIGN PATENT DOCUMENTS

CN 104852122 A 8/2015
CN 205543232 U 8/2016
(Continued)

*Primary Examiner* — Khai M Nguyen
(74) *Attorney, Agent, or Firm* — ScienBiziP, P.C.

(57) ABSTRACT

An antenna structure includes a housing and a feeding source. The housing forms a radiating portion, a first coupling portion, and a second coupling portion. The first coupling portion and the second coupling portion are grounded. The feeding source is electrically connected to the radiating portion for feeding current to the radiating portion and divides the radiating portion into a first radiating section and a second radiating section. When the feeding source supplies current, the current flows through the first radiating section and is coupled to the first coupling portion to activate a first operation mode and a second operation mode. When the feeding source supplies current, the current flows through the second radiating section and is coupled to the second coupling portion to activate a third operation mode and a fourth operation mode.

15 Claims, 10 Drawing Sheets

(51) Int. Cl.
*G06F 1/16* (2006.01)
*H04M 1/02* (2006.01)
*H01Q 5/335* (2015.01)
*H01Q 1/22* (2006.01)

(52) U.S. Cl.
CPC ........... *H01Q 1/2266* (2013.01); *H01Q 5/335* (2015.01); *H04M 1/026* (2013.01)

(58) Field of Classification Search
CPC ...... H01Q 1/243; H01Q 1/2266; H01Q 5/335; G06F 1/1626; G06F 1/1698; H04M 1/026
See application file for complete search history.

(56) References Cited

U.S. PATENT DOCUMENTS

| | | | | |
|---|---|---|---|---|
| 2014/0111384 | A1* | 4/2014 | Su | H01Q 9/0471 343/700 MS |
| 2014/0375522 | A1* | 12/2014 | Lin | H01Q 1/243 343/853 |
| 2016/0336644 | A1 | 11/2016 | Lee et al. | |
| 2018/0159221 | A1* | 6/2018 | Liou | H01Q 9/42 |

FOREIGN PATENT DOCUMENTS

| | | |
|---|---|---|
| TW | 201644095 A | 12/2016 |
| TW | 201712945 A | 4/2017 |

\* cited by examiner

ANTENNA STRUCTURE AND WIRELESS COMMUNICATION DEVICE USING SAME

FIELD

The subject matter herein generally relates to an antenna structure and a wireless communication device using the antenna structure.

BACKGROUND

Antennas are important components in wireless communication devices for receiving and transmitting wireless signals at different frequencies, such as signals in Long Term Evolution Advanced (LTE-A) frequency bands. However, the antenna structure is complicated and occupies a large space in the wireless communication device, which is inconvenient for miniaturization of the wireless communication device.

BRIEF DESCRIPTION OF THE DRAWINGS

Implementations of the present disclosure will now be described, by way of example only, with reference to the attached figures.

DETAILED DESCRIPTION

Figure 1:
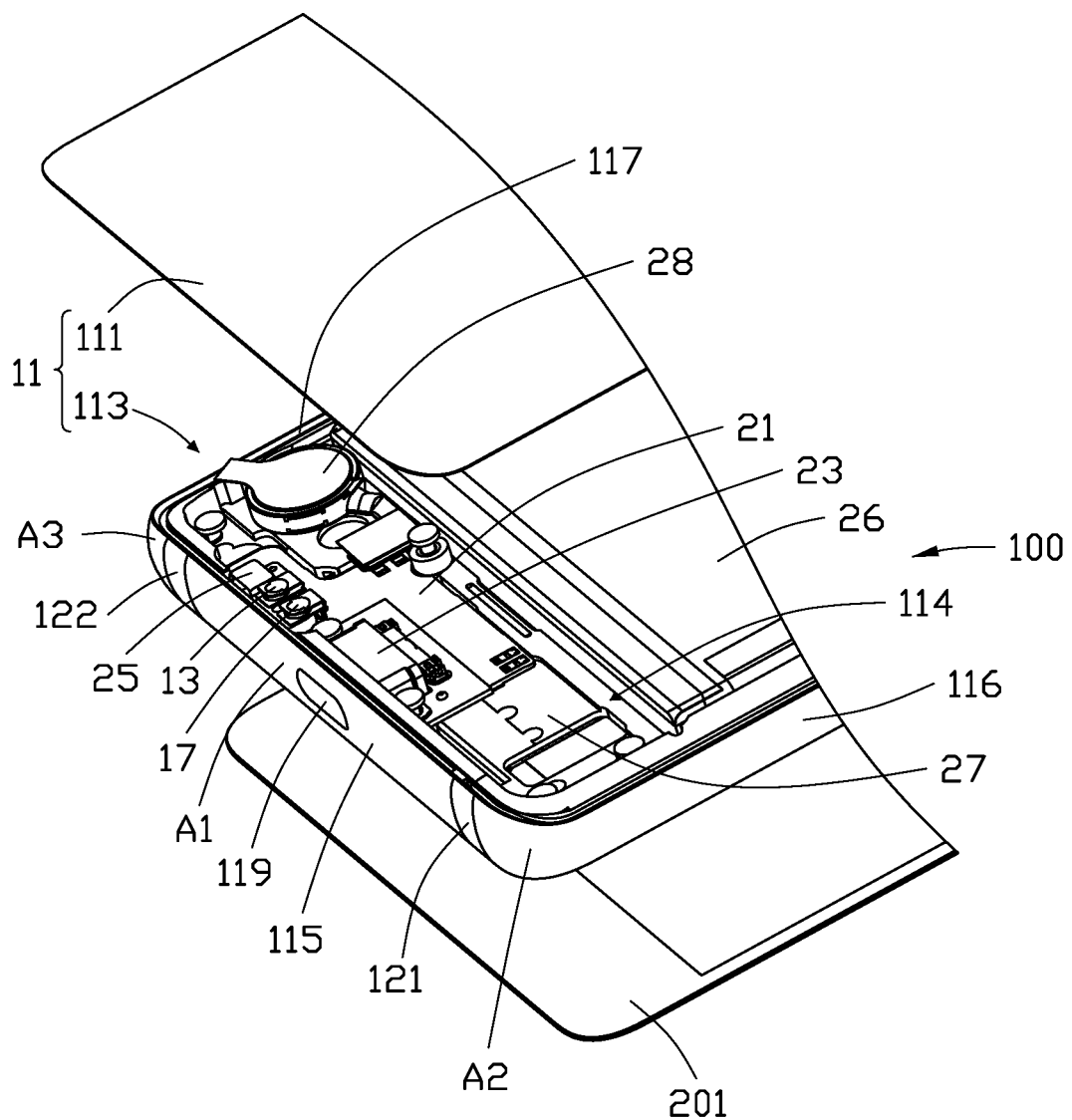
FIG. 1 is an isometric view of an exemplary embodiment of a wireless communication device using an exemplary antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using same.

FIG. 1 illustrates an exemplary embodiment of a wireless communication device 200 using an exemplary antenna structure 100. The wireless communication device 200 can be a mobile phone or a personal digital assistant, for example. The antenna structure 100 can receive and transmit wireless signals.

Figure 2:
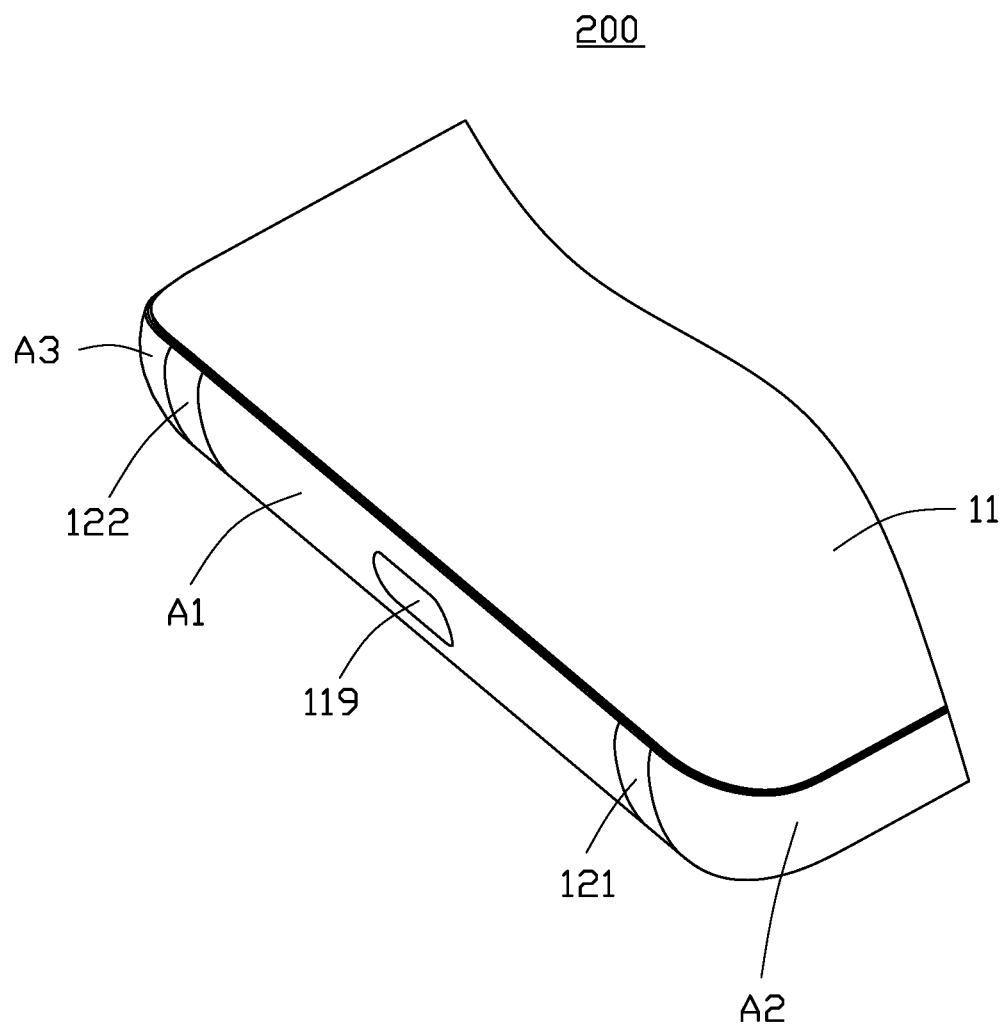
FIG. 2 is an assembled, isometric view of the wireless communication device of FIG. 1.
Figure 3:
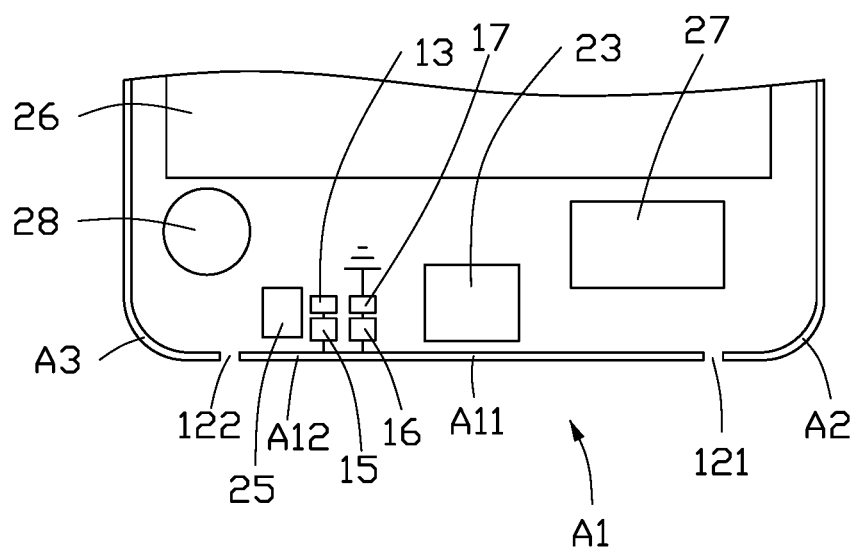
FIG. 3 is a circuit diagram of the antenna structure of FIG. 1.

As illustrated in FIG. 2 and FIG. 3, the antenna structure 100 includes a housing 11, a feeding source 13, and a matching circuit 15 (shown in FIG. 2).

The housing 11 houses the wireless communication device 200. In this exemplary embodiment, the housing 11 includes a backboard 111 and a side frame 113. In this exemplary embodiment, the backboard 111 is made of non-metallic material, for example, plastic or glass. The side frame 113 is made of metallic material. The backboard 111 and the side frame 113 cooperatively form the housing of the wireless communication device 200.

The side frame 113 is substantially annular. The side frame 113 defines an opening (not labeled). The wireless communication device 200 includes a display 201. The display 201 is received in the opening. The display 201 has a display surface. The display surface is exposed at the opening and is positioned parallel to the backboard 111.

In this exemplary embodiment, the side frame 113 is positioned around a periphery of the backboard 111. The side frame 113 and the backboard 111 cooperatively form a receiving space 114 with the opening. The receiving space 114 can receive a printed circuit board, a processing unit, or other electronic components or modules.

In this exemplary embodiment, the side frame 113 includes an end portion 115, a first side portion 116, and a second side portion 117. In this exemplary embodiment, the end portion 115 is a bottom portion of the wireless communication device 200. The first side portion 116 is spaced apart from and parallel to the second side portion 117. The end portion 115 has first and second ends. The first side portion 116 is connected to the first end of the end portion 115 and the second side portion 117 is connected to the second end of the end portion 115. In this exemplary embodiment, the end portion 115, the first side portion 116, and the second side portion 117 are all perpendicularly connected to the backboard 111.

The side frame 113 further defines a through hole 119, a gap 121, and a groove 122. The through hole 119 is defined at a middle position of the end portion 115 and passes through the end portion 115.

The wireless communication device 200 further includes a substrate 21 and at least one electronic elements. In this exemplary embodiment, the substrate 21 is a printed circuit board (PCB) and is made of dielectric material, for example, epoxy resin glass fiber (FR4) or the like. In this exemplary embodiment, the wireless communication device 200 includes five electronic elements, that is, a first electronic element 23, a second electronic element 25, a third electronic element 26, a fourth electronic element 27, and a fifth electronic element 28.

The first electronic element 23 is a Universal Serial Bus (USB) module. The first electronic element 23 is received in the receiving space 114. The first electronic element 23 is positioned adjacent to and is electrically connected to the substrate 21. The first electronic element 23 corresponds to the through hole 119. Then, the first electronic element 23 is partially exposed from the through hole 119. A USB device can be inserted in the through hole 119 and be electrically connected to the first electronic element 23.

The second electronic element 25 is a microphone. The second electronic element 25 is received in the receiving space 114 between the groove 122 and the first electronic element 23. The third electronic element 26 is a battery. The third electronic element 26 is received in the receiving space 114. The third electronic element 26 is spaced apart from the first electronic element 23 and the second electronic element 25. The fourth electronic element 27 is a loudspeaker. The fourth electronic element 27 is received in the receiving space 114 between the substrate 21 and the first side portion 116. The fifth electronic element 28 is a vibrator. The fifth electronic element 28 is received in the receiving space 114 between the substrate 21 and the second side portion 117.

In this exemplary embodiment, the gap 121 is defined at the side frame 113 between the through hole 119 and the first side portion 116. The groove 122 is defined at the side frame 113 between the through hole 119 and the second side portion 117. The gap 121 and the groove 122 are defined at two sides of the through hole 119. In this exemplary embodiment, the gap 121 and the groove 122 are both pass through and extend to cut across the side frame 113. The side frame 113 is divided into three portions by the gap 121 and the groove 122. The three portions are a radiating portion A1, a first coupling portion A2, and a second coupling portion A3.

In this exemplary embodiment, a first portion of the side frame 113 between the gap 121 and the groove 122 forms the radiating portion A1. A second portion of the side frame 113 extending from a side of the gap 121 adjacent to the first side portion 116 forms the first coupling portion A2. A third portion of the side frame 113 extending from a side of the groove 122 away from the gap 121 and adjacent to the second side portion 117 forms the radiating portion A3. In this exemplary embodiment, the first coupling portion A2 and the second coupling portion A3 are both grounded.

In this exemplary embodiment, the gap 121 and the groove 122 are both filled with insulating material, for example, plastic, rubber, glass, wood, ceramic, or the like, thereby isolating the radiating portion A1, the first coupling portion A2, and the second coupling portion A3.

FIG. 3 illustrates the feeding source 13 is positioned in the receiving space 114 between the first electronic element 23 and the second electronic element 25. One end of the feeding source 13 is electrically connected to the first radiating portion A1 through the matching circuit 15. The feeding source 13 divides the radiating portion A1 into two portions, that is, a first radiating section A11 and a second radiating section A12. A first portion of the side frame 113 between the feeding source 13 and the gap 121 forms the first radiating section A11. A second portion of the side frame 113 between the feeding source 13 and the groove 122 forms the second radiating portion A12.

In this exemplary embodiment, a location of the feeding source 13 does not correspond to a middle portion of the radiating portion A1. The first radiating section A11 is longer than the second radiating section A12.

When the feeding source 13 supplies current, a first portion of the current flows through the first radiating section A11 and is coupled to the first coupling portion A2 through the gap 121. Then, the feeding source 13, the first radiating section A11, and the first coupling portion A2 cooperatively form a coupling-feed antenna to activate the first operation mode and a second operation mode to generate radiation signals in a first radiation frequency band and a second radiation frequency band.

When the feeding source 13 supplies current, a second portion of the current flows through the second radiating section A12 and is coupled to the second coupling portion A3 through the groove 122. Then, the feeding source 13, the second radiating section A12, and the second coupling portion A3 cooperatively form a coupling-feed antenna to activate the third operation mode and a fourth operation mode to generate radiation signals in a third radiation frequency band and a fourth radiation frequency band.

In this exemplary embodiment, a frequency of the second radiation frequency band is higher than a frequency of the first radiation frequency band. A frequency of the third radiation frequency band is higher than a frequency of the second radiation frequency band. A frequency of the fourth radiation frequency band is higher than a frequency of the third radiation frequency band.

In this exemplary embodiment, the first operation mode is a Long Term Evolution Advanced (LTE-A) low frequency operation mode. The first radiation frequency band is about 700-960 MHz. The second operation mode is a LTE-A first middle frequency operation mode. The second radiation frequency band is about 1450-1990 MHz. The third operation mode is a LTE-A second middle frequency operation mode. The third radiation frequency band is about 1920-2170 MHz. The fourth operation mode is a LTE-A high frequency operation mode. The fourth radiation frequency band is about 2300-2690 MHz.

Figure 4:
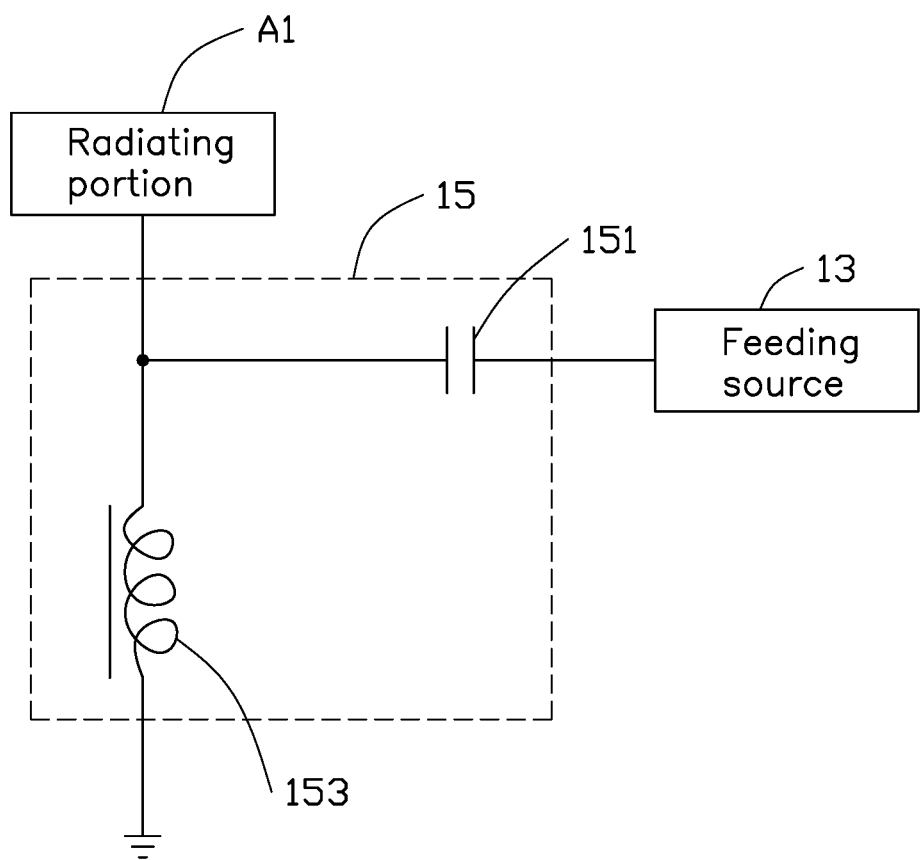
FIG. 4 is a circuit diagram of a matching circuit of the antenna structure of FIG. 3.

As illustrated in FIG. 4, in this exemplary embodiment, the matching circuit 15 is used for impedance matching for the radiation frequency bands of the antenna structure 100. The matching circuit 15 includes a first impedance element 151 and a second impedance element 153. One end of the first impedance element 151 is electrically connected to feeding source 13. Another end of the first impedance element 153 is electrically connected to the radiating portion A1. One end of the second impedance element 153 is electrically connected between the first impedance element 151 and the radiating portion A1. Another end of the second impedance element 153 is grounded.

In this exemplary embodiment, the first impedance element 151 is a capacitor. The second impedance element 153 is an inductor. A capacitance value of the first impedance element 151 is about 3 pF. An inductance value of the second impedance element 13 is about 6.2 nH.

In other exemplary embodiments, the first impedance element 151 and the second impedance element 153 are not limited to be a capacitor and an inductor, and can be other impedance elements or a combination.

Figure 5:
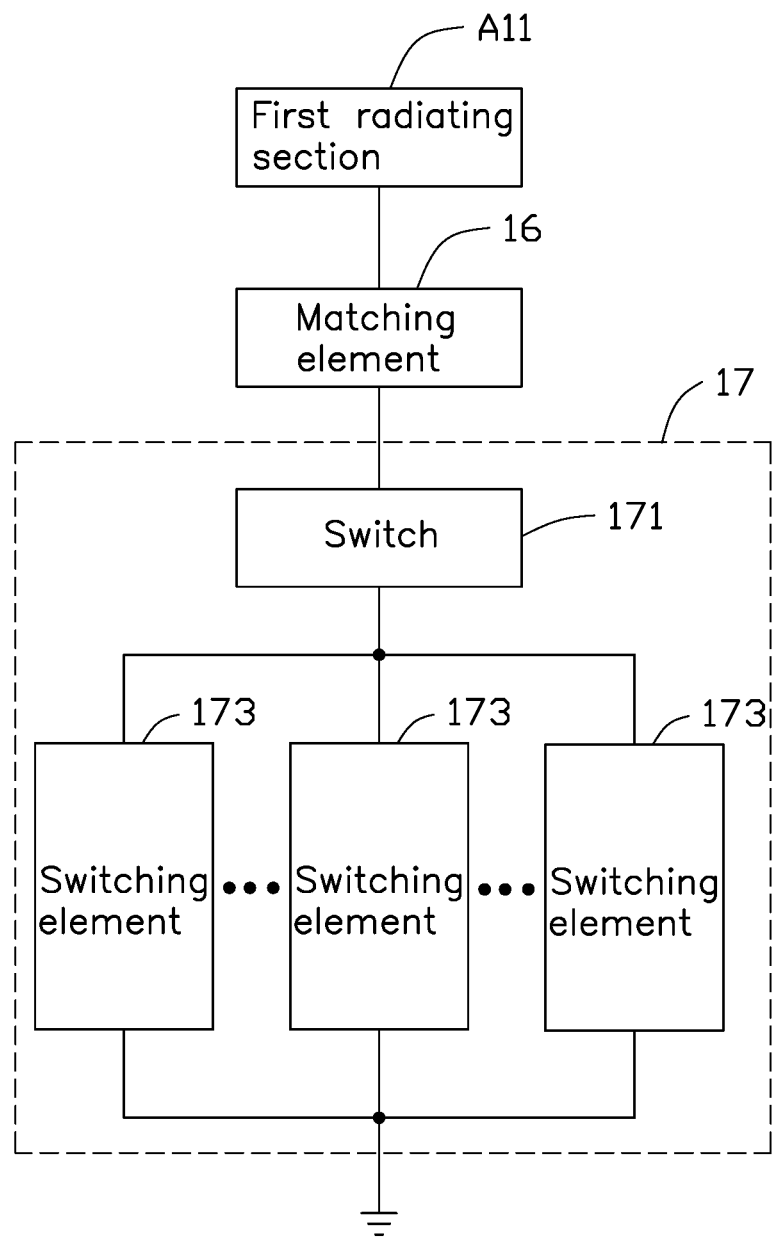
FIG. 5 is a circuit diagram of a switching circuit of the antenna structure of FIG. 3.
Figure 6:
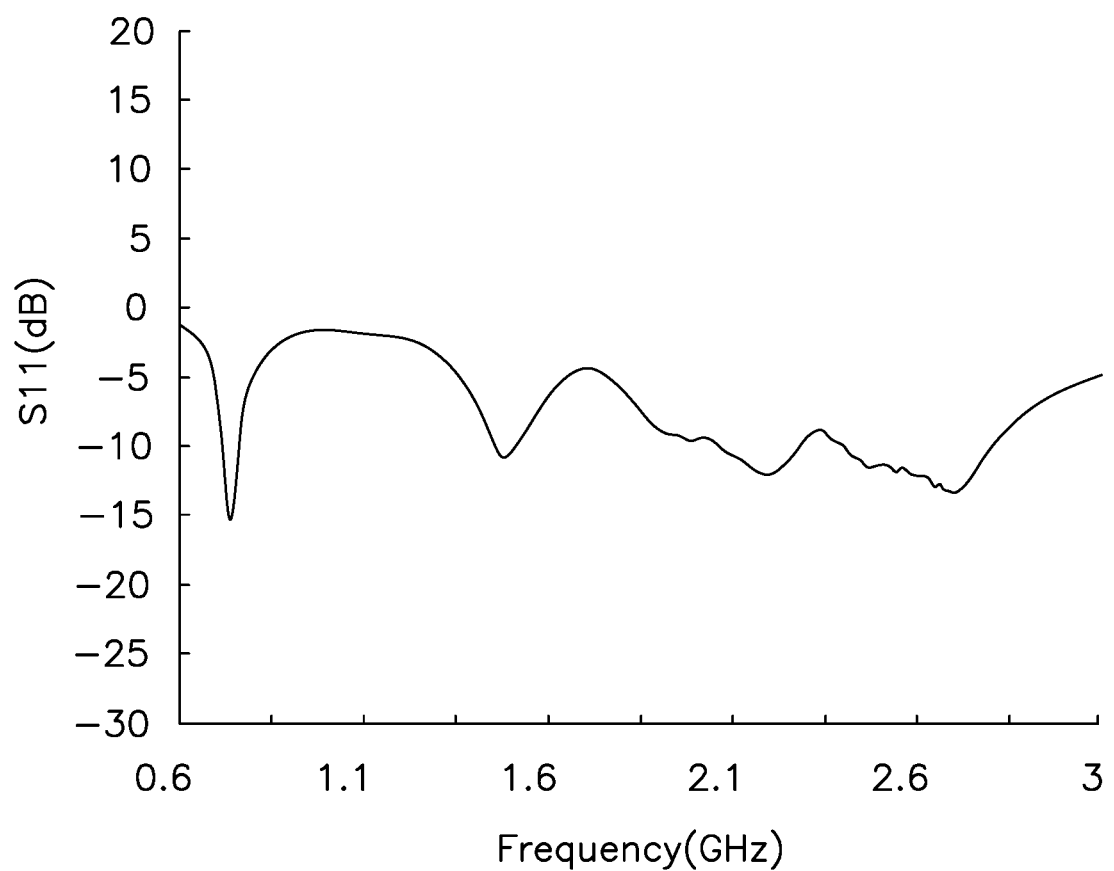
FIG. 6 to FIG. 9 are scattering parameter graphs of the antenna structure when the switching circuit of FIG. 5 switches to different switching elements.

As illustrated in FIG. 1, FIG. 3, and FIG. 5, in this exemplary embodiment, the antenna structure 100 further includes a matching element 16 and a switching circuit 17. The matching element 16 and the switching circuit 17 are both received in the receiving space 114 between the feeding source 13 and the first electronic element 23.

In this exemplary embodiment, the matching element 16 a capacitor and a capacitance value of the matching element 16 is about 33 pF. One end of the impedance element 16 is electrically connected to a location of the first radiating section A11 adjacent to the groove 122. Another end of the impedance element 16 is electrically connected to the switching circuit 17. One end of the switching circuit 17 is electrically connected to the matching element 16. Then the switching circuit 17 is electrically connected to the first radiating section A11 through the matching element 16. Another end of the switching circuit 17 is grounded.

The switching circuit 17 includes a switch 171 and a plurality of switching elements 173. The switch 171 is electrically connected to the matching element 16. Each of the switching elements 173 can be an inductor, a capacitor, or a combination of the inductor and the capacitor. The switching elements 173 are connected in parallel to each other. One end of each switching element 173 is electrically connected to the switch 171. The other end of each switching element 173 is grounded.

Through control of the switch 171, the first radiating section A11 can be switched to connect with different switching elements 173. Since each switching element 173 has a different impedance, the operating frequency band of the first operation mode can be adjusted.

Figure 7:
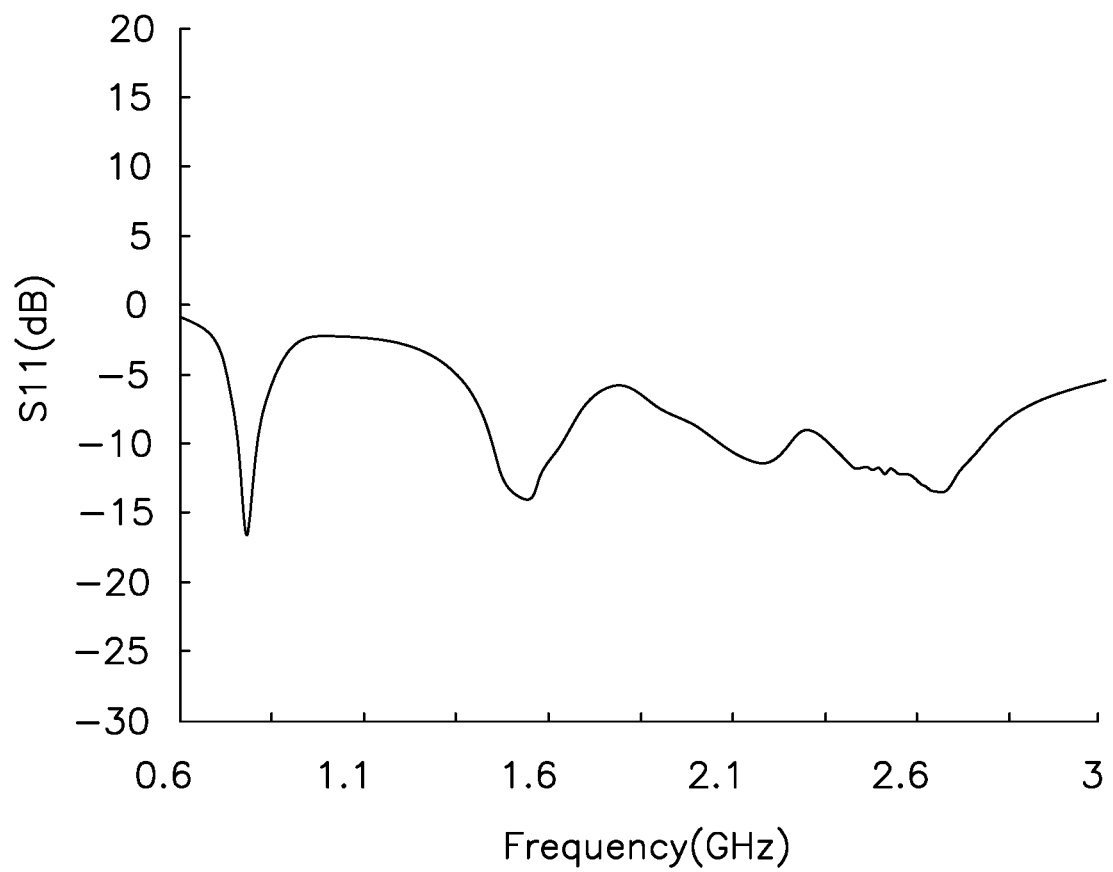
Figure 8:
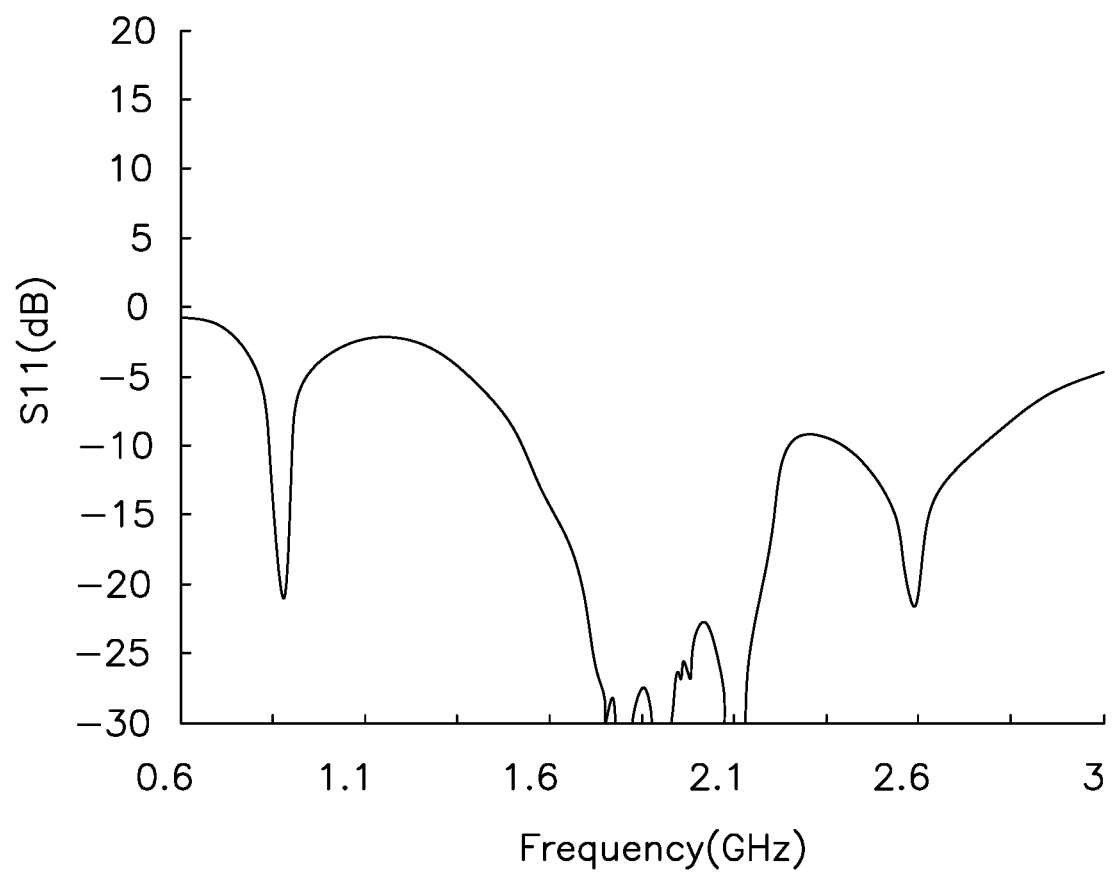
Figure 9:
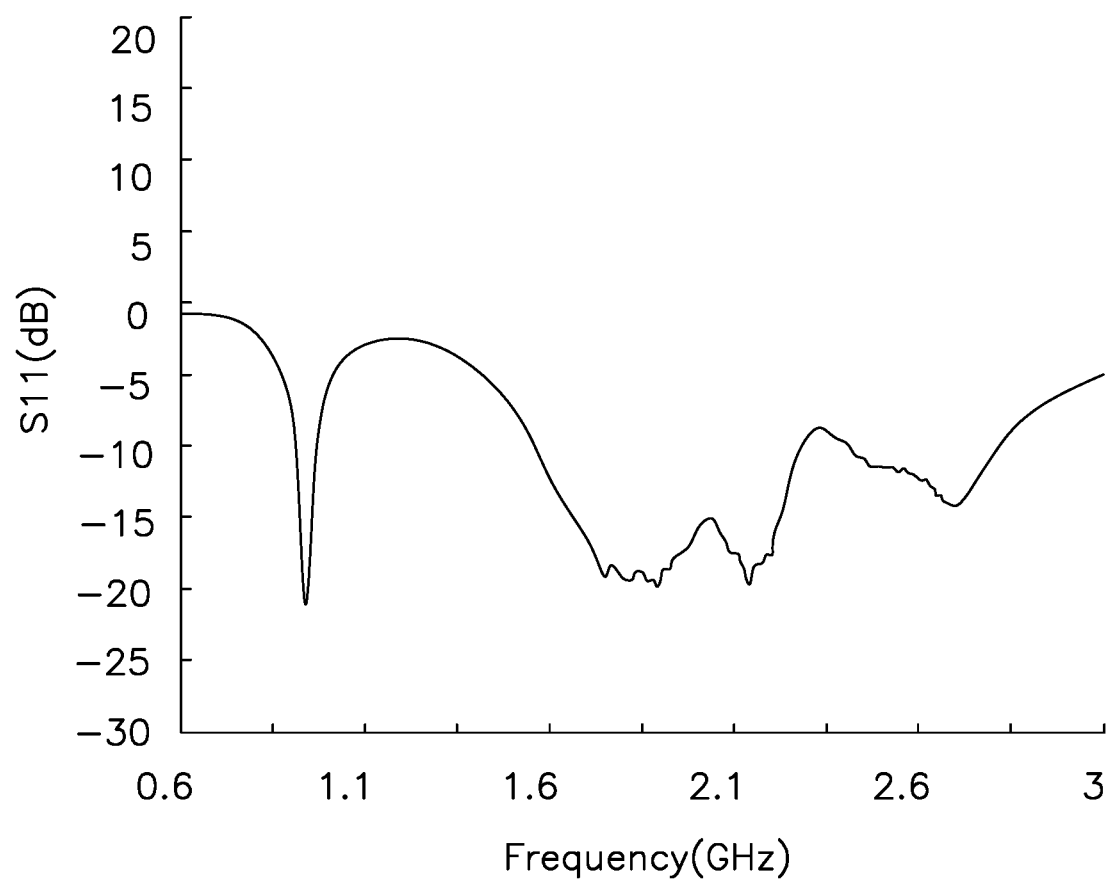

FIG. 6 to FIG. 9 illustrate scattering parameter graphs of the antenna structure 100 when the switch 171 switches to different switching elements 173. FIG. 6 to FIG. 9 respectively corresponds to four different frequency bands, and respectively correspond to four of multiple low frequency operation modes that the switching circuit 17 can be switched. For example, in FIG. 6, the antenna structure 100 can work at a frequency band of 700 MHz. In FIG. 7, the antenna structure 100 can work at a frequency band of 750 MHz. In FIG. 8, the antenna structure 100 can work at a frequency band of 800/850 MHz. In FIG. 9, the antenna structure 100 can work at a frequency band of 900/1400/1800/1900/2100/2300/2500 MHz.

In addition, when the switching circuit 17 is switched to one of the switching elements 173 and the antenna structure 100 works at a frequency band of 900 MHz, the antenna structure 100 also has good effects in the middle and the high frequency bands.

Figure 10:
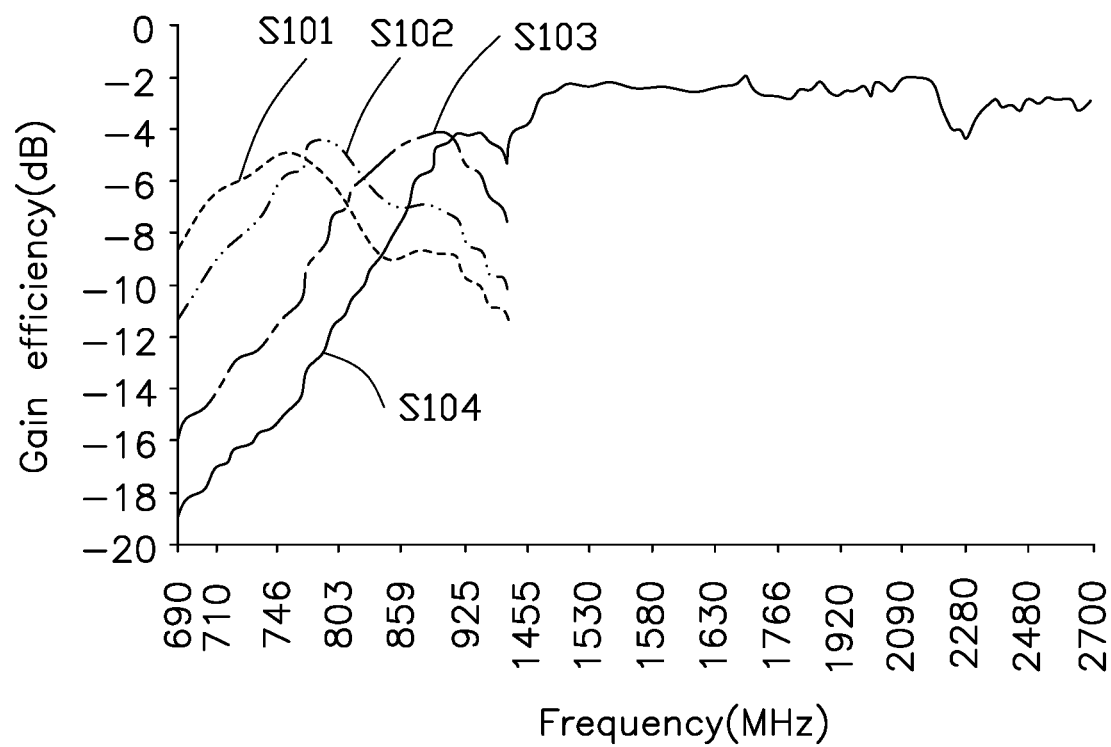
FIG. 10 is a gain efficiency graph of the antenna structure of FIG. 1.

FIG. 10 illustrates a gain efficiency graph of the antenna structure 100 when the switch 171 switches to different switching elements 173. Curves S101 to S104 respectively corresponds to four different frequency bands, and respectively correspond to four of multiple low frequency operation modes that the switching circuit 17 can be switched. Similarly, when the switching circuit 17 is switched to one of the switching elements 173 and the antenna structure 100 works at a frequency band of 900 MHz, the antenna structure 100 also has good effects in the middle and the high frequency bands.

As illustrated in FIG. 6 to FIG. 10, the antenna structure 100 may work at a corresponding LTE-A low frequency band, for example, a frequency band of 699-960 MHz. The antenna structure 100 may also work at a LTE-A middle frequency band (a frequency band of 1450-1990 MHz and a frequency band of 1920-2170 MHz) and a LTE-A high frequency band (a frequency band of LTE-A 2300-2690 MHz). That is, the antenna structure 100 may completely cover the LTE-A low, middle, and high frequency bands. When the antenna structure 100 works at these frequency bands, the antenna structure 100 has a good radiating efficiency, which satisfies antenna design requirements.

As described above, the antenna structure 100 defines the gap 121 and the groove 122, then the side frame 113 is divided into a first radiating section A11, a second radiating section A12, a first coupling portion A2, and a second coupling portion A3. The antenna structure 100 further includes the feeding source 13. The current from the feeding source 13 flows through the first radiating section A11 and is further coupled to the first coupling portion A2. The current from the feeding source 13 further flows through the second radiating section A12 and is coupled to the second coupling portion A3. Then the first radiating section A11 and the first coupling portion A2 cooperatively activate the first operation mode and the second operation mode to generate radiation signals in the low frequency band and the first middle frequency band. The second radiating section A12 and the second coupling portion A3 cooperatively activate the third operation mode and the fourth operation mode to generate radiation signals in the second middle frequency band and the high frequency band. The wireless communication device 200 can use the first radiating section A11, the second radiating section A12, the first coupling portion A2, and the second coupling portion A3 to receive or send wireless signals at multiple frequency bands simultaneously through carrier aggregation (CA) technology.

In addition, the antenna structure 100 includes the housing 11. The gap 121 and the groove 122 are both defined on the side frame 113 instead of the backboard 111. Then the antenna structure 100 can only use the side frame 113 to activate corresponding low, middle, and high frequency bands. Then the backboard 111 can be entirely made of non-metallic material, which is complete and beautiful, and can effectively adapt to a trend of a miniaturization of antenna clearance areas, and can also effectively ensure a stability of wireless signal reception.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:
   a housing, the housing forming a radiating portion, a first coupling portion, and a second coupling portion, the radiating portion, the first coupling portion, and the second coupling portion spaced apart from each other, the first coupling portion and the second coupling portion being grounded; and
   a feeding source, the feeding source electrically connected to the radiating portion for feeding current to the radiating portion, the feeding source further dividing the radiating portion into a first radiating section and a second radiating section;
   wherein the housing comprises a side frame, the side frame defines a gap and a groove, the gap and the groove both pass through and extend to cut across the side frame;
   wherein the side frame between the gap and the groove forms the radiating portion, a portion of the side frame extending from a side of the gap away from the radiating portion forms the first coupling portion, and a portion of the side frame extending from a side of the groove away from the radiating portion forms the second coupling portion;
   wherein when the feeding source supplies current, the current flows through the first radiating section and is coupled to the first coupling portion, the first radiating section and the first coupling portion cooperatively activate a first operation mode and a second operation mode to generate radiation signals in a first radiation frequency band and a second radiation frequency band; and wherein when the feeding source supplies current, the current flows through the second radiating section and is coupled to the second coupling portion, the second radiating section and the second coupling portion cooperatively activate a third operation mode and a fourth operation mode to generate radiation signals in a third radiation frequency band and a fourth radiation frequency band.

2. The antenna structure of claim 1, wherein a frequency of the fourth radiation frequency band is higher than a frequency of the third radiation frequency band, a frequency of the third radiation frequency band is higher than a frequency of the second radiation frequency band, and a frequency of the second radiation frequency band is higher than a frequency of the first radiation frequency band.

3. The antenna structure of claim 1, wherein the gap and the groove are both filled with insulating material.

4. The antenna structure of claim 1, further comprising a matching circuit, wherein the matching circuit is used for impedance matching for radiation frequency bands of the antenna structure, the matching circuit comprises a first impedance element and a second impedance element;

wherein one end of the first impedance element is electrically connected to feeding source, another end of the first impedance element is electrically connected to the radiating portion; and wherein one end of the second impedance element is electrically connected between the first impedance element and the radiating portion, another end of the second impedance element is grounded.

5. The antenna structure of claim 1, further comprising a matching element and a switching circuit, wherein the switching circuit comprises a switch and a plurality of switching elements, the switch is electrically connected to the first radiating section through the matching element, the switching elements are connected in parallel to each other, one end of each switching element is electrically connected to the switch and the other end of each switching element is grounded, the switching elements have different impedances;

wherein through controlling the switch, the switch is switched to connect with different switching elements for adjusting the first radiation frequency band.

6. The antenna structure of claim 1, wherein a wireless communication device uses the radiating portion, the first coupling portion, and the second coupling portion to receive or send wireless signals at multiple frequency bands simultaneously through carrier aggregation (CA) technology of Long Term Evolution Advanced (LTE-A).

7. The antenna structure of claim 1, wherein the housing further comprises a backboard, the side frame is positioned around a periphery of the backboard, and the backboard is made of non-metallic material.

8. A wireless communication device comprising:
an antenna structure, the antenna structure comprising:
a housing, the housing forming a radiating portion, a first coupling portion, and a second coupling portion, the radiating portion, the first coupling portion, and the second coupling portion spaced apart from each other, the first coupling portion and the second coupling portion being grounded; and a feeding source, the feeding source electrically connected to the radiating portion for feeding current to the radiating portion, the feeding source further dividing the radiating portion into a first radiating section and a second radiating section;

wherein the housing comprises a side frame, the side frame defines a gap and a groove, the gap and the groove both pass through and extend to cut across the side frame;

wherein the side frame between the gap and the groove forms the radiating portion, a portion of the side frame extending from a side of the gap away from the radiating portion forms the first coupling portion, and a portion of the side frame extending from a side of the groove away from the radiating portion forms the second coupling portion;

wherein when the feeding source supplies current, the current flows through the first radiating section and is coupled to the first coupling portion, the first radiating section and the first coupling portion cooperatively activate a first operation mode and a second operation mode to generate radiation signals in a first radiation frequency band and a second radiation frequency band; and wherein when the feeding source supplies current, the current flows through the second radiating section and is coupled to the second coupling portion, the second radiating section and the second coupling portion cooperatively activate a third operation mode and a fourth operation mode to generate radiation signals in a third radiation frequency band and a fourth radiation frequency band.

9. The wireless communication device of claim 8, further comprising a Universal Serial Bus (USB) module, wherein the housing defines a through hole, the USB module corresponds to the through hole and is partially exposed from the through hole.

10. The wireless communication device of claim 8, wherein a frequency of the fourth radiation frequency band is higher than a frequency of the third radiation frequency band, a frequency of the third radiation frequency band is higher than a frequency of the second radiation frequency band, and a frequency of the second radiation frequency band is higher than a frequency of the first radiation frequency band.

11. The wireless communication device of claim 8, wherein the gap and the groove are both filled with insulating material.

12. The wireless communication device of claim 8, wherein the antenna structure further comprises a matching circuit, the matching circuit is used for impedance matching for radiation frequency bands of the antenna structure, the matching circuit comprises a first impedance element and a second impedance element;

wherein one end of the first impedance element is electrically connected to feeding source, another end of the first impedance element is electrically connected to the radiating portion; and wherein one end of the second impedance element is electrically connected between the first impedance element and the radiating portion, another end of the second impedance element is grounded.

13. The wireless communication device of claim 8, wherein the antenna structure further comprises a matching element and a switching circuit, the switching circuit comprises a switch and a plurality of switching elements, the switch is electrically connected to the first radiating section through the matching element, the switching elements are connected in parallel to each other, one end of each switching element is electrically connected to the switch and the other end of each switching element is grounded, the switching elements have different impedances;

wherein through controlling the switch, the switch is switched to connect with different switching elements for adjusting the first radiation frequency band.

14. The wireless communication device of claim 8, wherein the wireless communication device uses the radiating portion, the first coupling portion, and the second coupling portion to receive or send wireless signals at multiple frequency bands simultaneously through carrier aggregation (CA) technology of Long Term Evolution Advanced (LTE-A).

15. The wireless communication device of claim 8, wherein the housing further comprises a backboard, the side frame is positioned around a periphery of the backboard, and the backboard is made of non-metallic material.

\* \* \* \* \*